Dec. 6, 1966 J. D. MENG 3,290,509

ELECTRO-OPTICAL APPARATUS AND CIRCUIT FOR SENSING REFLECTIVE AREAS OR APERTURES IN TAPE

Filed Oct. 30, 1963

INVENTOR.
JOHN D. MENG

BY

ATTORNEY

United States Patent Office 3,290,509
Patented Dec. 6, 1966

3,290,509

ELECTRO-OPTICAL APPARATUS AND CIRCUIT FOR SENSING REFLECTIVE AREAS OR APERTURES IN TAPE

John D. Meng, Phoenix, Ariz., assignor to General Electric Company, a corporation of New York Filed Oct. 30, 1963, Ser. No. 320,108
10 Claims. (Cl. 250—219)

This invention relates to object sensing circuits and more particularly to electro-optical circuits which are especially suited to sense reflective areas or apertures in tape employed in tape handlers of data processing systems.

Magnetic tape is widely used for storing information in high speed electronic data processing systems. The tape is usually carried on two storage reels, a supply reel and a take-up reel. As the tape is transferred from supply reel to take-up reel, it moves against a magnetic tape head which can either "read" stored information from the tape or can "write" information the tape for storage. For high speed storage and retrieval of the data on the tape it is important that the tape head has rapid access to various points along the length of the tape.

It is also important that it be possible to store data on the full length of the tape except for a short strip at either end which secures the tape to the reel. In order to utilize the maximum possible length of tape and still prevent the tape from becoming disengaged from either of the reels, an electrical signal must be provided to indicate when the end of the tape is approaching. This signal is applied to a tape controller which causes movement of the tape to be halted.

Some prior art tape handlers employ an electric lamp, a photoelectric cell and an amplifier to sense the end of the tape and provide a signal which halts movement of the tape. Light from the lamp passing through a hole in the tape near its end falls on the photoelectric cell producing a signal which is amplified and employed to halt movement of the tape. Other prior art tape handlers employ a reflective strip mounted on the tape near its end to reflect light from the lamp onto the surface of the photoelectric cell.

The signals developed by these photoelectric cells are much too small to be used directly by the tape controller. Therefore, such prior art handlers employ amplifiers comprising several direct-coupled amplifier stages to amplify the small signals of the photoelectric cells. This type of amplifier is relatively expensive to construct and the voltage level of the output signal drifts due to aging of circuit components and due to change in power supply voltages. Such direct-coupled amplifiers also require more expensive power supplies than conventional amplifiers due to the larger power supply voltage required to provide a sufficiently large output signal. In addition, the voltage from each power supply must be carefully regulated.

Another problem encountered in employing the end of tape sensing apparatus of the prior art is that ambient light rays from other sources are reflected from various surfaces onto the photoelectric cell. The ambient light generates unwanted or noise voltages in the photoelectric cell circuit which may result in erratic or spurious responses by the tape controller.

It is therefore the principal object of the present invention to provide an improved end-of-tape sensing electro-optical circuit.

Another object of this invention is to provide an end-of-tape sensing electro-optical circuit that delivers output signals of greater amplitude than the prior art circuits.

Another object of this invention is to provide an improved end-of-tape sensing circuit which is less expensive to construct than the prior art circuits.

Another object of this invention is to provide an improved end-of-tape sensing circuit which is more reliable in operation than the prior art circuits.

Still another object of this invention is to provide an improved end-of-tape sensing circuit delivering an output signal having a greater signal-to-noise ratio than the prior art circuits.

Disadvantages similar to those described above in connection with the prior art end-of-tape sensing circuits are found in circuits used to sense and identify apertures in punched tape and punched cards.

Therefore, a further object of this invention is to provide a new and improved punched tape reader circuit.

A still further object of this invention is to provide an improved punched card reader circuit.

The foregoing objects are achieved by providing an object sensing circuit wherein the light from the lamp is controlled to actuate a light responsive semiconductor device. A light reflecting strip is mounted near each end of the reel of tape. Light from the lamp is guided by a first optical fiber to the tape surface. When the tape is sufficiently unwound from one of the storage reels and the light reflecting strip is properly positioned with respect to the first optical fiber, light is reflected into another optical fiber which guides the light and causes it to strike a light responsive semiconductor device. This semiconductor device acts as a switch which closes, thereby providing a large signal voltage that in turn, causes movement of the tape to be halted. Since the semicondutcor device acts as either an open or a closed switch, variation in ordinary room light does not develop noise voltage in the output signal voltage. A more detailed description of the operation of a light responsive semiconductor device can be found in an article entitled, The Light Actuated Switch, by D. R. Grafham and E. K. Howell, dated February 1963, and published by the General Electric Company, Auburn, New York.

Other objects and advantages of the invention will become apparent from the following detailed description when taken in connection with the accompanying drawings, wherein.

Figure 1:
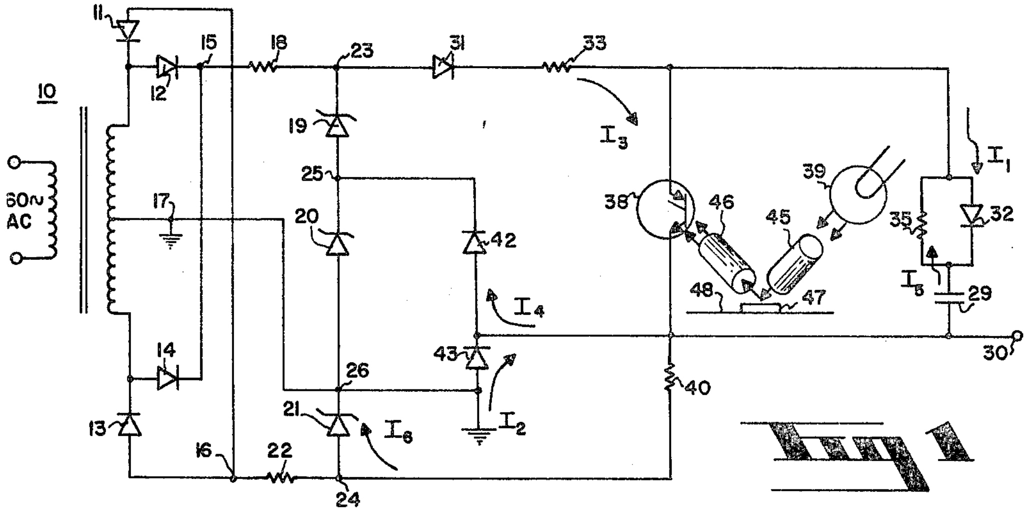
FIG. 1 is a diagram of one embodiment of the present invention.
Figure 2:
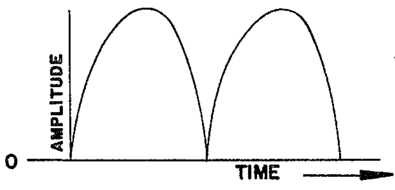
FIGS. 2 and 3 are waveforms useful in explaining the operation of the instant invention.

A transformer 10, energized from an alternating current power source provides power for the circuit of FIG. 1. A pair of diodes 11 and 12 have opposite electrodes connected to one end of the secondary winding of transformer 10. A pair of diodes 13 and 14 have opposite electrodes thereof connected to the other end of the secondary winding of transformer 10. The other electrodes of diodes 12 and 14 are connected to terminal 15. The other electrodes of diodes 11 and 13 are connected to the terminal 16. Accordingly, the combination of transformer 10 with diodes 11, 12, 13 and 14 functions as a full wave rectifier circuit to provide positive unidirectional voltage pulses, shown in FIG. 2, between terminals 15 and 16. A terminal 17 is connected to the center of the secondary winding of transformer 10 and is also connected to ground.

Figure 3:
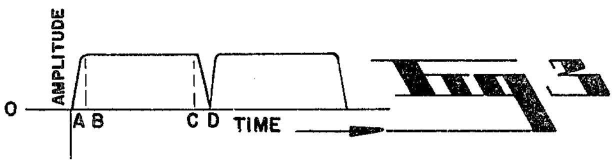

A resistor 18, a plurality of Zener diodes 19, 20 and 21 and resistor 22 are connected in series across terminals 15 and 16 and provide amplitude limited voltage pulses between nodes 23 and 24 of the series connection. The Zener diode has the characteristic of providing a constant voltage drop across its terminals for a wide range of amplitude of currents flowing through the diode in a reverse direction. Therefore, the voltage differences between node 23 and node 24 will be constant whenever the voltage applied between terminals 15 and 16 exceeds the sum of the "Zener" or critical reverse breakdown voltages of diodes 19, 20 and 21 as shown in FIG. 3. In a similar manner, the voltage between nodes 23 and 25 and between nodes 25 and 26 will have a constant maximum amplitude. In a typical circuit, the maximum voltage between nodes 23 and 25 is plus 6 volts.

A capacitor 29 is employed to increase the time duration of the current delivered to an output terminal 30. Diodes 31 and 32 prevent the capacitor 29 from discharging too rapidly when the input pulse voltage drops below the value of the voltage on capacitor 29. The anode of diode 31 is connected to node 23 and the cathode connected to one end of a resistor 33, which has the other end thereof connected to the anode of diode 32. One terminal of capacitor 29 is connected to the cathode of diode 32 and the other terminal connected to terminal 30.

A resistor 35 provides the correct discharge time for capacitor 29. Resistor 35 is connected between anode and cathode of diode 32.

A light actuated switch 38 functions to control the current delivered to output terminal 30 in response to light received from a light source 39. The anode of switch 38 is connected to the anode of diode 32, and the cathode of switch 38 is connected to output terminal 30. A resistor 40 has one end thereof connected to node 24 and the other end thereof connected to the cathode of switch 38.

A light actuated switch is a two-terminal semi-conductor device which can be used as an ON-OFF switch. The switch acts as an open circuit when the amount of light falling on a light sensitive region thereof is less than a critical value and no current can flow from anode to cathode thereof. If the amount of light exceeds the critical value, the switch fires or turns on. When the light actuated switch fires, it readily conducts current from the anode to the cathode. Once the switch fires, the only manner in which it can again become an open circuit is by reducing the current through the switch below the value of a "holding current," which is the minimum current required to maintain the light actuated switch in the conductive condition.

A pair of diodes 42 and 43 limit the upper and lower values of the signal voltage at terminal 30. The anode of diode 42 is connected to the cathode of switch 38. The cathode of diode 42 is connected to common connection point 25 between the anode of Zener diode 19 and the cathode of Zener diode 20. The cathode of diode 43 is connected to the cathode of switch 38; and the anode of diode 40 is connected to ground or some other reference potential and to common connection point 26.

A pair of optical fibers 45 and 46 and a light reflective strip 47 serve to channel light from light source 39 to switch 38. Strip 47 is mounted on a tape 48. When tape 48 is properly positioned, light from light source 39 is channeled by fiber 45 to strip 47 which reflects the light into fiber 46. Fiber 46 channels the light to switch 38. The operation of the circuit of FIG. 1 will now be described. Assume first that strip 47 is not opposite fibers 45 and 46, so that no light falls on light actuated switch 38, and it acts as an open circuit. FIG. 3 illustrates the voltage waveform between node 23 and node 24. At time B (FIG. 3), a current $I_1$ flows from node 23, through diode 31, resistor 33, diode 32, to the upper plate of capacitor 29, from the lower plate of capacitor 29 through resistor 40 to node 24, thereby charging capacitor 29 to a voltage which will be approximately equal to the maximum value of the voltage between nodes 23 and 26. In a typical example, in which the maximum value of the voltage between node 23 and ground will be approximately plus 12 volts, capacitor 29 will be charged to approximately 12 volts.

Since no current is flowing through switch 38, the voltage at terminal 30 will be clamped at ground potential by diode 43. A current $I_2$ flows from ground, through diode 43, and resistor 40 to the negative node 24, thereby holding the cathode of switch 38 and terminal 30 at ground potential.

At time D (FIG. 3), the cathode of switch 38 and terminal 30 are still at approximately ground potential. If the voltage at the cathode of switch 38 becomes slightly negative, current $I_2$ flows from ground, through diode 43, thereby holding the cathode of switch 38 near ground potential. If the voltage at the cathode of switch 38 becomes slightly positive, a current $I_6$ flows from the cathode of switch 38, through resistor 40 and Zener diode 21 to ground, thereby holding the cathode of switch 38 at approximately ground potential.

Assume now that strip 47 is moved to a position opposite fibers 45 and 46. Sufficient light will now fall on light actuated switch 38 so that a positive voltage will be present on output terminal 30 during the time a positive voltage is present between nodes 23 and 24. When the amount of light falling on switch 38 renders it conductive, a current $I_3$ flows from node 23, through diode 31, resistor 33, anode to cathode of switch 38, and resistor 40 to node 24. A current $I_4$, supplied by switch 38, flows through diode 42 to node 25 thereby clamping the voltage at terminal 30 to the potential at node 25. The output waveform will again be that shown in FIG. 3 and in the typical example may have a maximum amplitude of about a positive 6 volts.

Capacitor 29 provides current through switch 38 when the voltage at node 23 drops below the value needed to provide the minimum current required to maintain the switch in the conductive condition. With the high speed tapes now used in electronic data processing systems, the tape may be moving so rapidly that reflective strip will not halt in the correct position to maintain light on switch 38. The strip may move beyond the position required to reflect the light to switch 38. When strip 47 is properly positioned, a current $I_5$ flows from the upper plate of capacitor 29, through resistor 35 and anode to cathode of switch 38 to the lower plate of capacitor 29 thereby maintaining switch 38 conductive. Without current $I_5$, switch 38 would be rendered nonconductive when the voltage of the applied waveform of FIG. 3 drops to zero at time D. If no light falls on switch 38, the switch will remain open when the next voltage pulse is applied, so the output waveform would consist of one or two pulses. Without capacitor 29 an output voltage would be present only while reflective strip 47 is positioned between optical fibers 45 and 46. By proper choice of values of capacitor 29 and resistor 35, an output voltage having a time duration of several pulses will be present at terminal 30 even though light no longer falls on switch 38. This output voltage causes movement of the tape to be halted. The waveform at terminal 30 is shown in FIG. 3.

When current $I_5$ drops below the "holding current" required to maintain switch 38 in a conductive condition, switch 38 will again become an open circuit.

Thus the objects set forth herein are realized by the instant invention, wherein an unregulated, full-wave power supply, a light actuated switch, four diodes, and a trio of Zener diodes, connected and disposed in a novel arrangement are employed instead of the much more expensive and less stable prior art circuit using a photoelectric cell, a plurality of direct coupled amplifiers and a plurality of voltage regulated power supplies.

Figure 4:
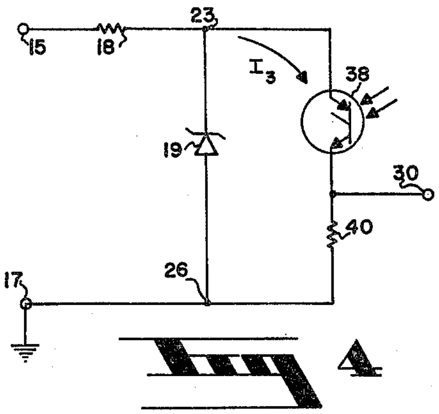
FIG. 4 is a diagram of another embodiment of the present invention.

FIG. 4 illustrates a modification of the circuit shown in FIG. 1 wherein like parts have similar reference characters. The circuit in FIG. 4 differs from the circuit shown in FIG. 1 in that several of the elements have been removed. The waveform of FIG. 2 between terminals 15 and 17 is clipped by resistor 18 and Zener diode 19 to provide the waveform (FIG. 3) between nodes 23 and 26, which in a typical example may have a peak of plus 6 volts between node 23 and ground.

When no light falls on light actuated switch 38, it acts as an open circuit. No current flows through resistor 40 and the voltage at terminal 30 will be ground potential.

When sufficient light falls on light actuated switch 38, the waveform shown in FIG. 3 will be present on terminal 40. When the amount of light falling on switch 38 renders it conductive, a current $I_3$ flows from node 23, through switch 38 and resistor 40 to node 26. The voltage waveform of FIG. 3 will be present between terminal 30 and ground.

The circuit of FIG. 4 is less expensive to construct than that of FIG. 1 and has the same levels of output voltages. Some tape controllers employ the signal from terminal 30 to actuate a relay and halt movement of the tape. Such controllers require a signal voltage having a time duration of at least two pulses, as a time duration of at least two pulses may be required to close the relay contacts. The circuit of FIG. 1 works best with such controllers. For other tape controllers employing faster acting, solid state circuits, the circuit of FIG. 4 presents an improved, reliable and inexpensive object sensing circuit.

Thus the objects set forth herein, are realized by the instant invention, wherein an unregulated, full-wave power supply, a light actuated switch and a Zener diode, connected and disposed in a novel arrangement are employed instead of a much more expensive and less stable prior art circuit using a photoelectric cell, a plurality of direct-coupled amplifiers and a plurality of voltage-regulated power supplies. The amplitude of the signal voltage at terminal 30 is determined by the voltage of the full-wave power supply and the Zener diode used. A large signal of several volts amplitude can easily be obtained by proper choice of elements. Since the light actuated switch acts as either open circuit or a low resistance closed switch, the signal does not drift or slowly change levels as in prior art circuits.

Optical fibers 45 and 46 (FIG. 1 and FIG. 5) serve to channel radiation from light source 39 to light actuated switch 38. In FIG. 1, light from light source 39 is guided by optical fiber 45 to the reflective area 47 which is mounted on a tape 48; light rays reflected from area 47 into optical fiber 46 are guided to light actuated switch 38. The optical fibers serve to channel the light from source 39 so that a greater fraction of the light leaving the source reaches switch 38 when area 47 is properly positioned. Also, the optical fibers reduce the amount of ordinary light from the room reaching switch 38. Only light rays striking the end of an optical fiber at the proper angle can enter the fiber. Such rays must strike the end of the fiber at approximately a right angle. Any room light entering the upper end of fiber 45 (FIG. 1), can enter fiber 46 only if reflected by strip 47. Tape 48 prevents other room light from striking the lower end of fiber 46. Since most of room light will not enter the fiber, the chances of room light producing a signal voltage at terminal 30 (FIG. 1 and FIG. 4) is greatly reduced.

Figure 5:
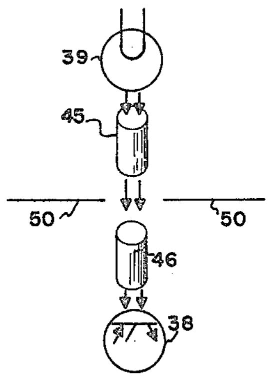
FIG. 5 illustrates another use of optical fibers in the present invention.

FIG. 5 illustrates the use of optical fibers in card or punched paper tape readers. When a hole in a card or punched paper tape 50 is properly positioned, light from light source 39 is channeled by optical fiber 45 to a hole in card 50, through the hole in fiber 46. Fiber 46 channels the light to light actuated switch 38.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. An object sensing circuit for use with a source of unidirectional pulses and a controllable source of light comprising means to amplitude limit said pulses, a pair of input terminals, means to apply said amplitude limited pulses to said pair of terminals, a light actuated switch having an anode and a cathode, said anode of said switch being connected to a first of said input terminals, an output terminal, said cathode of said switch being connected to said output terminal, and resistive means connecting said cathode of said switch to a second of said input terminals, whereby said switch controls current to said output terminal in response to the amount of light from said source of light coupled to said switch.

2. An object sensing circuit for use with a source of unidirectional pulses comprising means to amplitude limit said pulses, a pair of input terminals, means to apply said amplitude limited pulses to said pair of terminals, a light actuated switch having an anode and a cathode, said anode of said switch being connected to a first of said input terminals, an output terminal, said cathode of said switch being connected to said output terminal, a controllable source of light, means to couple said source of light to said switch, and resistive means connecting said cathode of said switch to a second of said input terminals, whereby said switch controls current to said output terminal in response to the amount of light from said source of light coupled to said switch.

3. An object sensing circuit for use with a source of unidirectional pulses and a controllable source of light comprising a pair of input terminals, said input terminals being connected to said source of pulses, a Zener diode having a cathode and an anode, resistive means connecting said cathode of said diode to a first of said terminals, means connecting said anode of said diode to the second of said terminals to provide a source of amplitude limited pulses, an output terminal, a light actuated switch having an anode and a cathode, and a resistor, said resistor and said switch being serially connected between said cathode of said diode and said second of said input terminals, said output terminals being connected to a junction between said resistor and said switch, whereby said switch controls current to said output terminals in response to the amount of light from said source of light coupled to said switch.

4. An object sensing circuit for use with a source of unidirectional pulses and a controllable source of light comprising a pair of input terminals, said input terminals being connected to said source of pulses, a Zener diode having a cathode and an anode, resistive means connecting said cathode of said diode to a first of said terminals, means connecting said anode of said diode to the second of said terminals to provide a source of amplitude limited pulses, a light actuated switch having an anode and a cathode, said anode of said switch being connected to said cathode of said diode, an output terminal, said cathode of said switch being connected to said output terminal, and resistive means connecting said cathode of said switch to said second of said input terminals, whereby said switch controls current to said output terminal in response to the amount of light from said source of light coupled to said switch.

5. An object sensing circuit for use with a source of unidirectional pulses comprising a pair of input terminals, said input terminals being connected to said source of pulses, a Zener diode having a cathode and an anode, resistive means connecting said cathode of said diode to a first of said terminals, means connecting said anode of said diode to the second of said terminals to provide a source of amplitude limited pulses, a light actuated switch having an anode and a cathode, said anode of said switch being connected to said cathode of said diode, an output terminal, said cathode of said switch being connected to said output terminal, and resistive means connecting said cathode of said switch to said second of said input terminals, a light source, a means for channeling radiation from said light source over a controllable path to said switch, a light controlling means, said controlling means being positioned to regulate the amount of light from said light source channeled to said switch, whereby said switch provides a standardized signal to said output terminal in response to the amount of light from said source of light coupled to said switch.

6. An object sensing circuit for use with a source of unidirectional pulses comprising a pair of input terminals, said input terminals being connected to said source of pulses, a Zener diode having a cathode and an anode, resistive means connecting said cathode of said diode to a first of said terminals, means connecting said anode of said diode to the second of said terminals to provide a source of amplitude limited pulses, a light actuated switch having an anode and a cathode, said anode of said switch being connected to said cathode of said diode, an output terminal, said cathode of said switch being connected to said output terminal, and resistive means connecting said cathode of said switch to said second of said input terminals, a light source, a means for channeling radiation from said light source over a controllable path to said switch, a light controlling means, said controlling means being positioned to regulate the amount of light from said light source channeled to said switch, whereby said switch controls current to said output terminal in response to the amount of light from said source of light coupled to said switch.

7. An object sensing circuit for use with a source of unidirectional pulses comprising a pair of input terminals, said input terminals being connected to said source of pulses, a voltage regulator diode having a cathode and an anode, said diode maintaining a constant voltage between said anode and said cathode when current through said diode is within predetermined limits, resistive means connecting said cathode of said diode to a first of said terminals, means connecting said anode of said diode to the second of said terminals to provide a source of amplitude limited pulses, a light actuated switch having an anode and a cathode, said anode of said switch being connected to said cathode of said diode, an output terminal, said cathode of said switch being connected to said output terminal, and resistive means connecting said cathode of said switch to said second of said input terminals, a light source, a means for channeling radiation from said light source over a controllable path to said switch, a light controlling means, said controlling means being positioned to regulate the amount of light from said light source channeled to said switch, whereby said switch controls current to said output terminal in response to the amount of light from said source of light coupled to said switch.

8. An object sensing device for use with a source of unidirectional pulses, a controllable source of light and a means for channeling radiation over a controllable path, comprising first and second unidirectional pulse reference potentials, first, second and third serially connected Zener diodes each having an anode and a cathode, resistive means connecting said cathode of said first Zener diode to said first reference potential, resistive means connecting said anode of said third Zener diode to said second reference potential, said anode of said second Zener diode being connected to ground; a light actuated switch having an anode and a cathode, a first, second, third and fourth diode each having an anode and a cathode, said anode of said first diode being connected to said cathode of said first Zener diode, resistive means connecting said cathode of said first diode to said anode of said switch, resistive means connecting said cathode of said switch to said anode of said third Zener diode, said cathode of said second diode being connected to said cathode of said second Zener diode, said anode of said second diode being connected to said cathode of said switch, said cathode of said third diode being connected to said cathode of said switch, said anode of said third diode being connected to ground, said anode of said fourth diode being connected to said anode of said switch, capacitive coupling means arranged between said cathode of said fourth diode and said cathode of said switch, resistive means coupling said cathode of said fourth diode to said anode of said fourth diode, an output terminal, said output terminal being connected to said cathode of said switch, and a light controlling means, said controlling means being positioned to regulate the amount of light from said light source channeled to said switch, whereby said switch controls current to said output terminal in response to the amount of light from said source of light coupled to said switch.

9. An object sensing device for use with a source of unidirectional pulses, comprising first and second unidirectional pulse reference potentials, first, second and third serially connected Zener diodes each having an anode and a cathode, resistive means connecting said cathode of said first Zener diode to said first reference potential, resistive means connecting said anode of said third Zener diode to said second reference potential, said anode of said second Zener diode being connected to ground; a light actuated switch having an anode and a cathode, a first, second, third and fourth diode each having an anode and a cathode, said anode of said first diode connected to said cathode of said first Zener diode, resistive means connecting said cathode of said first diode to said anode of said switch, resistive means connecting said cathode of said switch to said anode of said third Zener diode, said cathode of said second diode being connected to said cathode of said second Zener diode, said anode of said second diode being connected to said cathode of said switch, said cathode of said third diode being connected to said cathode of said switch, said anode of said third diode being connected to ground, said anode of said fourth diode being connected to said anode of said switch, capacitive coupling means arranged between said cathode of said fourth diode and said cathode of said switch, resistive means coupling said cathode of said fourth diode to said anode of said fourth diode, an output terminal, said output terminal being connected to said cathode of said switch, a light source, and a means to control the amount of light from said source of light falling on said switch to control voltage potential at said cathode of said switch.

10. An object sensing device comprising a source of unidirectional pulses having first and second unidirectional pulse reference potentials, first, second and third serially connected Zener diodes each having an anode and a cathode, resistive means connecting said cathode of said first Zener diode to said first reference potential, resistive means connecting said anode of said third Zener diode to said second reference potential, said anode of said second Zener diode being connected to ground; a light actuated switch having an anode and a cathode, a first, second, third and fourth diode each having an anode and a cathode, said anode of said first diode connected to said cathode of said first Zener diode, resistive means connecting said cathode of said first diode to said anode of said switch, resistive means connecting said cathode of said switch to said anode of said third Zener diode, said cathode of said second diode being connected to said cathode of said second Zener diode, said anode of said second diode being connected to said cathode of said switch, said cathode of said third diode being connected to said cathode of said switch, said anode of said third diode being connected to ground, said anode of said fourth diode being connected to said anode of said switch, capacitive coupling means arranged between said cathode of said fourth diode and said cathode of said switch, resistive means coupling said cathode of said fourth diode to said anode of said fourth diode, an output terminal, said output terminal being connected to said cathode of said switch, a light source, a means for channeling radiation from said light source over a controllable path to said switch, and means to control the amount of light from said source of light falling on said switch to control voltage potential at said cathode of said switch.

References Cited by the Examiner

UNITED STATES PATENTS

| | | | |
|---|---|---|---|
| 2,971,716 | 2/1961 | Sampson | 242—55.13 |
| 3,065,355 | 11/1962 | Barnes | 250—219 |
| 3,173,025 | 3/1965 | Davidson | 307—88.5 |

RALPH G. NILSON, *Primary Examiner.*

W. STOLWEIN, *Assistant Examiner.*